United States Patent [19]
Kohart

[11] 3,789,490
[45] Feb. 5, 1974

[54] STUD STORAGE SYSTEM
[75] Inventor: Ralph A. Kohart, Cherry Hill, N.J.
[73] Assignee: Omark Industries, Inc., Portland, Oreg.
[22] Filed: Feb. 17, 1972
[21] Appl. No.: 227,122

[52] U.S. Cl............... 29/211 R, 29/212, 228/49
[51] Int. Cl.............................................. B23q 7/10
[58] Field of Search .......... 29/211 R, 212 R, 212 T; 227/112; 228/49

[56] References Cited
UNITED STATES PATENTS

| | | | |
|---|---|---|---|
| 3,367,015 | 2/1968 | Brosene, Jr. | 227/112 X |
| 3,488,825 | 1/1970 | Lundgren | 29/212 T |
| 3,494,014 | 2/1970 | Lundgren | 29/212 R |
| 3,495,318 | 2/1970 | Houston | 29/211 R |
| 3,618,192 | 11/1971 | Hoffken | 29/203 B |

*Primary Examiner*—Thomas H. Eager
*Attorney, Agent, or Firm*—Charles F. Duffield

[57] ABSTRACT

A portable stud storage system for use with stud welding apparatus of the type employing a stud orientating apparatus which delivers studs to a stud feeding apparatus that in turn delivers studs to a stud welding gun for welding. The stud storage apparatus employs a housing and a coil of hollow tubing into which the studs are fed, after orientation, at a first location, whereupon the loaded magazine is transported to a remote second location and interconnected to the stud feeding apparatus at which the studs are discharged from the opposite end of the coil and fed to the stud welding gun.

3 Claims, 5 Drawing Figures

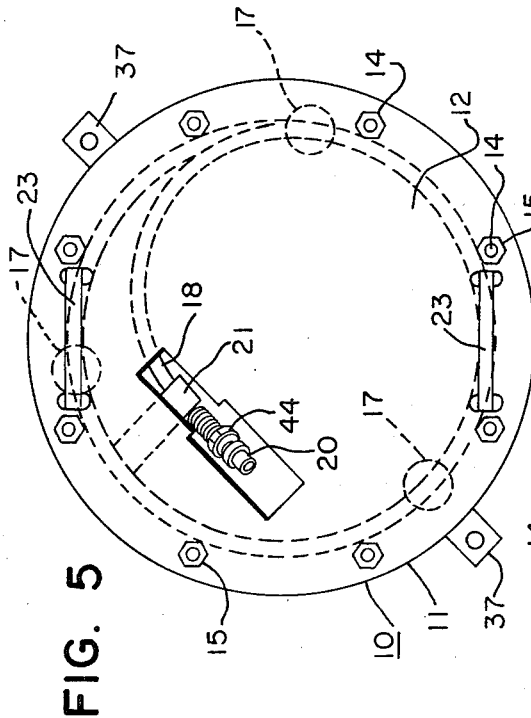
FIG. 5
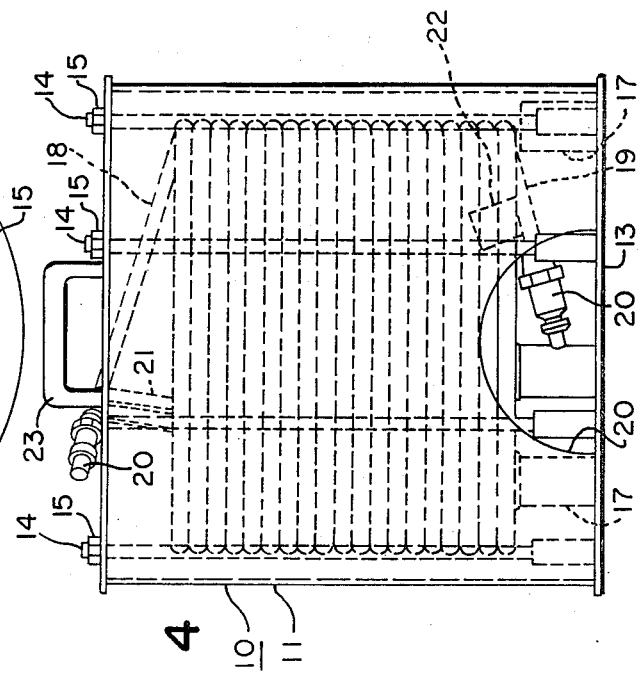
FIG. 4
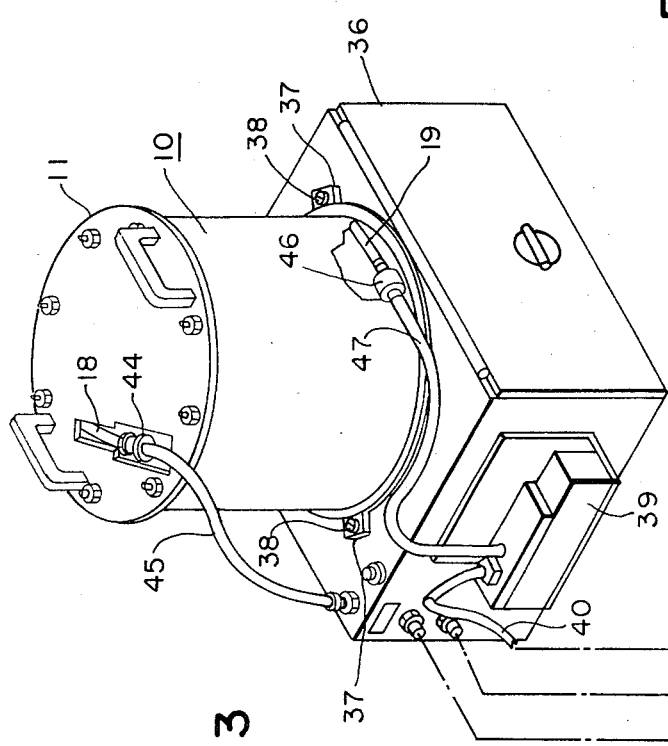
FIG. 3
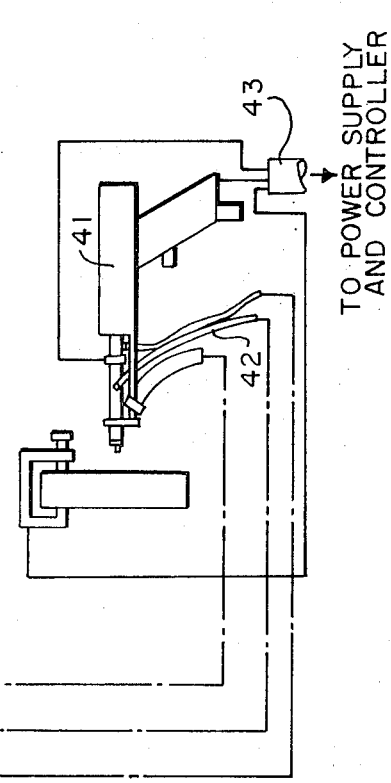

STUD STORAGE SYSTEM

BACKGROUND OF INVENTION

The present invention applies to stud welding apparatus and, more specifically, to a stud storage magazine for use with stud orientating and stud feeding apparatus.

The stud end welding technique has been in use in the industry for a number of years. The stud welding equipment has developed from stud welding guns into which individual studs were hand loaded to present day equipment in which the studs are automatically loaded.

Automatic stud loading equipment often is employed with studs which have a given end configuration which must be fed to the stud welding gun in a given direction. In such a case, a stud orientating apparatus must be employed which will properly orientate the studs and deliver them to the stud feeding machanism for ultimate delivery to the stud welding gun.

Such an automated stud welding system would include the components of a stud welding gun, a power supply for the stud welding gun, a stud orientating apparatus, a stud feeding apparatus interconnected between the stud welding gun and stud orientating apparatus and, lastly, a controller for coordinating the actions of the various major components. Such a stud welding system is shown in U.S. Pat. No. 3,586,814.

One typical application of such a stud welding system is the repair of boilers. In such an application, a plurality of small studs are welded, in close relationship one to another, to the walls and tubes of a boiler to enhance heat exchange between the combustion products of the boiler and the water circulating within the walls and tubes of the boiler. Such studs are welded when the boiler is first installed and also are rewelded in boilers during overhauls thereof.

A particular problem arises in welding studs within a boiler during an overhaul. At such a time, the environment within the boiler is extremely dirty and abrasive. When conventional automatic stud welding systems are employed, it is necessary to position the stud orientating apparatus within the boiler. This is necessary in order to position the orientating apparatus adjacent the stud feeding mechanism, all of which must be reasonably close to the stud welding gun. In such a situation, very often the dirt and other contaminants within the boiler find their way into the stud orientating apparatus and ultimately into the stud feeding mechanism and stud welding gun itself. When this happens, jamming and clogging of the gun and feed mechanism occurs.

Another problem which is experienced with the conventional stud welding systems is that every stud welding gun must have its own independent and separate stud orientating apparatus. A stud orientating apparatus in such a system is a reasonably expensive piece of equipment and thus the overall costs of a system employing more than one stud welding gun is naturally increased.

OBJECTS AND SUMMARY OF INVENTION

It is an object of the present invention to provide improvements to a stud welding system which will permit remote orientation and loading of the studs which may thereafter be transported to and used in any environment at a remote position.

It is a further object of the present invention to provide improvements to a stud welding system which will permit one orientating apparatus to orientate and supply studs for use with a number of stud welding guns.

The present invention carries out the foregoing objects by providing a stud storage magazine which may be connected to a stud orientating apparatus at one position and, after being filled, transported to a remote position for use in conjunction with a stud feeding and welding gun.

The stud storage magazine employs a housing and a helical coil of tubing within the housing. The tubing is designed to have an entrance or feeding end at the upper end thereof which is connected to the stud orientating apparatus. The orientated studs are fed into the helical coil and vibrated downwardly therein toward the opposite and lower end of the coil until the coil is full. Once the coil is full, the magazine is then transferred to a stud feeding apparatus in a remote position whereupon the studs are discharged from the helical coil, one at a time, to the stud feeding mechanism and to the stud welding gun as required.

A plurality of stud storage magazines may be employed. The stud orientating apparatus is capable of loading studs into the magazines faster than the studs are welded by the stud welding apparatus. Accordingly, one stud orientating apparatus may fill any number of stud storage magazines for use with a plurality of stud welding guns.

Other objects and advantages of the present invention will become apparent from the detailed description thereof taken in conjunction with the drawings.

DESCRIPTION OF DRAWINGS

FIG. 3 is a perspective view of the stud storage magazine in use with a stud feeding and stud welding apparatus;

FIG. 4 is a partially cut away side view of the stud storage magazine of the present invention; and, FIG. 5 is a top view of the stud storage magazine shown in FIG. 4.

DETAILED DESCRIPTION OF INVENTION

Figure 2:
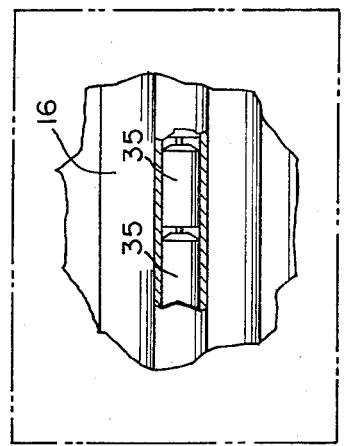
FIG. 2 is an enlarged view, partially in section, of a portion of the helical coils of the stud welding magazine.

The stud storage magazine of the present invention is shown best in FIGS. 4 and 5. The magazine 10 generally employs a cylindrical outer housing 11. Closure plates 12 at the top and 13 at the bottom are disposed on either end of the housing 11. Eight elongate studs 14 are secured to the bottom of closure plate 13 and extend through apertures in the upper closure plate 12. Suitable fastening means such as nuts 15 are threaded onto the threaded ends of the studs 14 to secure the closure plates in place to make the overall housing 11.

Disposed within the housing 10 is a helical coil of hollow tubular material 16. The internal diameter of the tube 16 is sufficient to pass a stud of a particular diameter and length which is desired to be welded.

The entire helical coil 16 rests upon three pedestals 17 which are secured to the bottom closure plate 13. The upper end 18 of the coil is elevated so as to project above the upper closure plate 12. Likewise, the lower end 19 of the helical coil projects slightly below the lowest full coil resting upon the pedestal 17 and into an open access opening 20 in the lower side wall of the cylindrical housing 11.

The upper end 18 of the helical coil is secured in place by means of a support bracket 21. In a like manner, the lower end 19 of the helical coil is secured in place by means of a similar support bracket 22.

Both the upper end 18 and lower end 19 of the helical coil include a quick disconnect fitting 20. These quick disconnect fittings are used for connection to the stud orientating apparatus and stud feeding apparatus as hereinafter described.

A pair of lifting handles 23 are secured to the top closure plate 12. These lifting handles permit the ready lifting and transporting of the stud storage magazine between the stud orientating apparatus and the stud discharge apparatus as hereinafter described.

Figure 1:
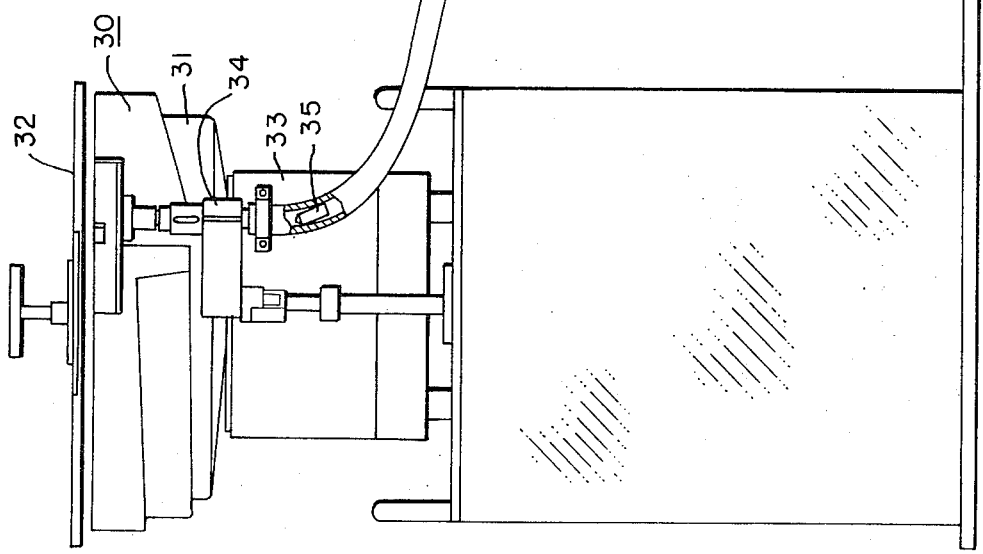
FIG. 1 is a side view of the stud storage magazine in use in conjunction with a stud orientating apparatus.

The stud storage magazine is used in a stud welding system as shown in FIGS. 1–3. Referring specifically to FIG. 1, the stud storage magazine is disposed in position on top of a vibrator 24. The base plate 25 of the vibrator 24 provides the supporting surface for the lower closure plate 13 of the stud storage magazine 10. Suitable alignment means such as dowel and alignment hole means are provided between the support plate 25 and lower closure plate 13. A plurality of tension clamps 26 are provided around the periphery of the supporting plate 25 and engage the upper surface of the lower closure plate 13 of the stud storage magazine to maintain it in firm engagement with the vibrator 24.

When the stud storage magazine is being filled, the lower end of the helical coil 19 is closed by means of a blind quick disconnect plug 27. The upper end of the helical coil is interconnected by means of a quick disconnect coupling 28 to a supply tube 29 which leads to the discharge end of a stud orientating apparatus 30.

The stud orientating apparatus 30 is of a conventional type and, in general, employs a vibratory bowl 31 and cover plate 32. The studs to be orientated are placed within the vibratory bowl and a vibrating mechanism 33 is energized which causes the studs to be orientated within the mechanism and discharged through a discharge assist 34 into the fed tube 29 and ultimately into the helical coil 16 within the stud storage magazine 10.

In operation, the stud storage magazine 10 is positioned on the vibrator 24 and interconnected to the stud orientation mechanism as above described. Thereafter, the stud orientation mechanism is turned on and, as well, the vibrator 24. As the studs are fed through the discharge tube 29 to the helical coil 16, the vibrations from the vibrator 23 will aid in their movement along and downwardly in the helical coil 16 until the coil is full. Once the coil is full, the stud storage magazine is disconnected and transported to a remote position of use with a stud welding gun as shown in FIG. 3.

The studs are fed into the helical coil 16 in end to end relationship as shown in the enlarged sctional view of FIG. 2. The vibratory action of the vibrator 24 aids and assists in the movement of the studs along and downwardly into the helical coil 16 until the coil is entirely filled.

Turning now to FIG. 3, the stud storage magazine 10 is shown in position upon a stud feeding mechanism 36. Alignment of the stud storage mechanism 10 upon the stud feeding apparatus is accomplished by means of two lugs 37 extending from the lower closure plate 13 of the housing. The lugs 37 include apertures therein which align with upperly projecting dowel pins 38 which extend from the upper surface of the stud feeding mechanism 36.

The stud feeding apparatus 36 is conventional and includes an escapement mechanism 39 which, by means of air pressure, feeds a stud through a discharge line 40 to a stud welding gun 41. The stud welding gun includes air hoses 42 which are interconnected with the stud feeding mechanism 36 and sequenced in accordance with the feeding of a stud to operate a pneumatic cylinder within the gun to retract and extend a stud feeding ram to position the stud within the chuck of the stud welding gun as is well known in the art. Additionally, the stud welding gun 41 includes a multiconductor cable 43 which includes the conductors for the power supply and control signals to the controller for the stud welding system as is likewise well known in the art.

In operation, the upper end 18 of the helical coil is connected, by means of a quick disconnect fitting 44, to an air pressure supply hose 45. A constant supply of air pressure is, in this manner, provided against the studs within the helical coil of the stud supply magazine.

The lower end 19 of the stud supply magazine is interconnected, by means of a quick disconnect fitting 46, to a stud supply tube 47. The opposite end of the stud supply tube 47 leads to the escapement mechanism 39.

The constant supply of air pressure against the studs within the helical coil urges the studs downwardly through the coil and into the supply tube 47. The studs are thus constantly urged into the stud escapement mechanism 39. Upon a command from the stud welding apparatus for another stud, the escapement mechanism will operate, as in a conventional manner, to feed a stud to the stud welding gun and the stud supply mechanism will supply the next to be fed stud.

When the stud supply magazine is empty, the magazine will be quickly disconnected and removed from the stud feeding apparatus and a refilled magazine interconnected in its place. Thereafter, the empty magazine will be returned to the remote station for refilling.

In a typical application, the helical coil was made approximately 12 inches in diameter and 9 inches high. The coil was internally dimensioned to receive a three-eighths diameter stud which was three-fourths inches in length. A helical coil of these dimensions will hold approximately 750 studs.

Studs of this size, when used with a conventional vibratory feeder, may be loaded at the approximate rate of 3,000 an hour into the helical coil. The typical rate of welding studs of this size with the conventional hand held stud welding equipment available today is in the range of approximately 750 studs per hour. Accordingly, it was found that one stud orientating apparatus could easily supply four stud welding guns when used in conjunction with the stud welding magazine of the present invention.

From the foregoing, it will be appreciated that the present invention provides a stud storage magazine which may be loaded remotely in a clean environment and be used at a second location in less favorable environment. Additionally, the stud storage magazine of the present invention permits the use of a singular stud orientating apparatus in conjunction with a plurality of stud welding guns.

The present invention has been described in respect to a particular embodiment thereof shown in the drawings. However, no limitation upon the scope of the invention is thereby intended.

I claim:

1. In stud welding apparatus of the type which welds studs by the stud end welding technique and employs apparatus for orientating the studs, apparatus for feeding the studs to a stud welding gun and a stud welding gun for welding the studs, the improvements comprising, a portable stud storage magazine having a housing and an elongate hollow tubular member therein, said tubular member being adapted to receive studs from the stud orientating apparatus at a first location remote from the stud welding gun and adapted to be transported within the housing, when filled with studs, for interconnection with the stud feeding apparatus at a second location.

2. The stud welding apparatus of claim 1 wherein the elongate hollow tubular member is formed into a helical coil disposed within said housing.

3. The stud welding apparatus of claim 2 wherein the helical coil is disposed within said housing in a vertical position and wherein a first end of the coil at the uppermost end of the helix forms the entrance end for studs delivered to the coil and wherein the lower end of the coil forms a discharge end for the studs.

* * * * *